Patented Feb. 14, 1950

2,497,454

UNITED STATES PATENT OFFICE 2,497,454

MANUFACTURE OF COMPOSITE PRODUCTS OF RUBBER AND RAYON AND THE PRODUCTS OBTAINED THEREBY

James William Illingworth, Little Aston, Sutton Coldfield, and Evelyn William Madge, Sutton Coldfield, England, assignors to Dunlop Tire & Rubber Corporation, Buffalo, N. Y., a corporation of New York No Drawing. Application April 27, 1945, Serial No. 590,732. In Great Britain April 6, 1944

Section 1, Public Law 690, August 8, 1946
Patent expires April 6, 1964

6 Claims. (Cl. 154—136)

Our invention relates to the manufacture of composite products of rubber and rayon. It is particularly concerned with the manufacture of pneumatic tyre covers having a structure which comprises plies of rubberised rayon cord, and with other products of the rubber industry comprising strata of rubber and rayon such as belting and hose.

There has been described a method of causing rubber to adhere to rayon cords, rayon fabric or the like by treating the rayon with an adhesive comprising an aqueous solution or dispersion of heat-hardening aldehyde-resin-forming substances, for example, phenolic compounds and aldehydes which are water-soluble to the extent of 0.5–5% by weight, drying the adhesive, plying the rayon with sheets of compounded vulcanisable rubber and subjecting the mass to a vulcanising temperature. The phenolic compounds said to be particularly satisfactory for the process were the polyphenols, especially those having hydroxyl groups in meta relationship in the benzene nucleus.

It is an object of the present invention to provide a process for the manufacture of composite products of rubber and rayon whereby the operations of applying an aqueous preparation of adhesive to the rayon and drying the preparation before application of the vulcanisable rubber thereto are avoided.

We have found that a strong bond between rubber and rayon is obtained by the employment of a rayon containing a synthetic resin capable of being formed in an alkaline solution.

We accordingly provide a process for the manufacture of composite products of rubber and rayon comprising applying a vulcanisable rubber composition to an assemblage of yarns formed from viscose containing a synthetic resin capable of being formed in an alkaline solution and vulcanising the structure so formed by heating.

We also provide a process of improving the adhesion between assemblages of rayon yarns and rubber compositions in composite products of rubber and rayon which includes the step of incorporating with the viscose from which the rayon yarns are formed a synthetic resin capable of being formed in an alkaline solution.

Preferably, said synthetic resin does not exceed 2% by weight of the viscose and comprises the reaction product of formaldehyde and a polyhydric phenol in which the hydroxyl groups are in meta relationship in the benzene nucleus.

Yarn of regenerated cellulose containing the reaction product of the formaldehyde and the phenol may be made, from a mixture of viscose the formaldehyde and the phenol or from a mixture of viscose and a previously-prepared condensation product of the formaldehyde and the phenol, in a manner similar to that adopted in the production of viscose rayon yarn, the mixture being extruded through a plurality of apertures into a precipitating bath of acid coagulant and the resulting filaments being assembled into a thread.

A rayon cord employed in the manufacture of pneumatic tyre covers in accordance with the invention is, for example, made in the following manner. 3 parts by weight of formaldehyde are added to 4 parts of resorcinol in a medium of aqueous sodium hydroxide and the resulting solution is mixed with cellulose xanthate solution during or after the stage at which the cellulose xanthate is treated with sodium hydroxide in order to allow ripening to take place and so produce a viscose suitable for spinning, the quantity of resorcinol-formaldehyde being of the order of 1% of the cellulose content of the viscose. Note that we use very small quantities of the resin as such are ideal for the purpose of the present invention providing the required adhesion and avoiding the disadvantages of greater amounts.

The ripened viscose is spun to thread comprising 500 filaments of 1100 denier with a twist of about 3.5 turns per inch. The twist of the thread is increased to about 17 turns per inch and two such threads are combined by twisting them together, with about 11.5 turns per inch in the opposite direction, to produce a cord.

The yarn employed in the process of the invention may be doubled, cabled or woven to fabric before application of the vulcanisable rubber composition thereto. In the production of the so-called "weftless cord fabric" from which are cut the "fabric plies" employed in tyre cover fabrication, a plurality of cords in parallel arrangement are topped by the agency of a calender with a vulcanisable rubber composition.

The rubber ingredient of the vulcanisable rubber composition employed may be a natural rubber or the like, a so-called synthetic rubber or the like, for example a copolymer of butadiene and styrene, a reclaimed rubber or the like, or a mixture of these materials.

Having described our invention, what we claim is:

1. Process for the manufacture of composite products of rubber and rayon comprising applying a vulcanizable rubber composition to an assemblage of yarn formed from rayon containing the resin product of the reaction of formaldehyde and a phenol, the proportion of said phenol product being not more than 2% by weight based on the dry weight of the rayon.

2. The process of claim 1 in which said phenol is a polyhydric phenol.

3. The process of claim 1 wherein said phenol is a polyhydric phenol having the hydroxyl groups in meta position in the benzene nucleus of said phenol.

4. A composite article comprising vulcanized rubber bonded to viscose rayon cords, each filament of which has the reaction product of formaldehyde and a phenol distributed uniformly throughout it, the proportion of said reaction product of formaldehyde and a phenol in the filaments being from a small amount to not more than 2% by weight based on the dry weight of the viscose rayon.

5. The article of claim 4 in which said reaction product is a reaction product of formaldehyde and a polyhydric phenol.

6. The article of claim 4 in which said reaction product is a reaction product of formaldehyde and a polyhydric phenol and in which the hydroxyl groups are in meta position in the nucleus.

JAMES WILLIAM ILLINGWORTH.
EVELYN WILLIAM MADGE.

REFERENCES CITED

The following references are of record in the file of this patent:

UNITED STATES PATENTS

| Number | Name | Date |
|---|---|---|
| 1,374,718 | Bronnert | Apr. 12, 1921 |
| 2,080,002 | Bitter | May 11, 1937 |
| 2,155,067 | Ubbelohde | Apr. 18, 1939 |
| 2,211,951 | Hershberger | Aug. 20, 1940 |
| 2,291,208 | Brown | July 28, 1942 |
| 2,322,981 | Ubbelohde | June 29, 1943 |

FOREIGN PATENTS

| Number | Country | Date |
|---|---|---|
| 501,611 | Great Britain | Mar 2, 1939 |
| 850,498 | France | Sept. 11, 1939 |

OTHER REFERENCES

Ellis Chemistry of Synthetic Resins, vol. I, pages 371–372, Reinhold Pub. Corp., New York (1935).

Latex and Rubber Derivatives, Marchionna, published by The Rubber Age, New York, vol. II, pages 443, 444.